Jan. 14, 1941.   M. W. LA FEVER   2,228,274
CALCULATING DEVICE
Filed July 30, 1938   3 Sheets-Sheet 1
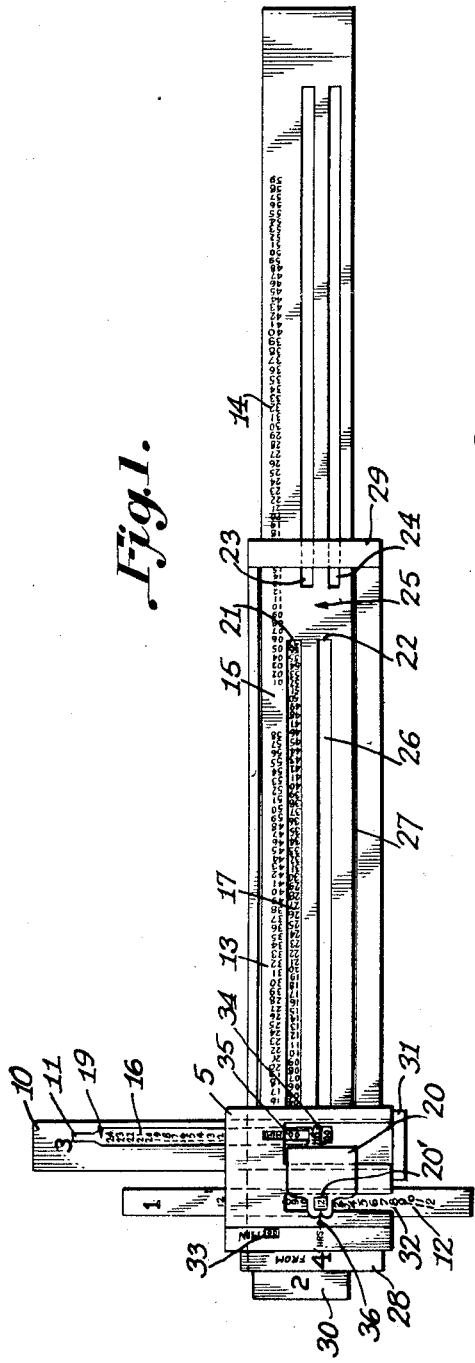
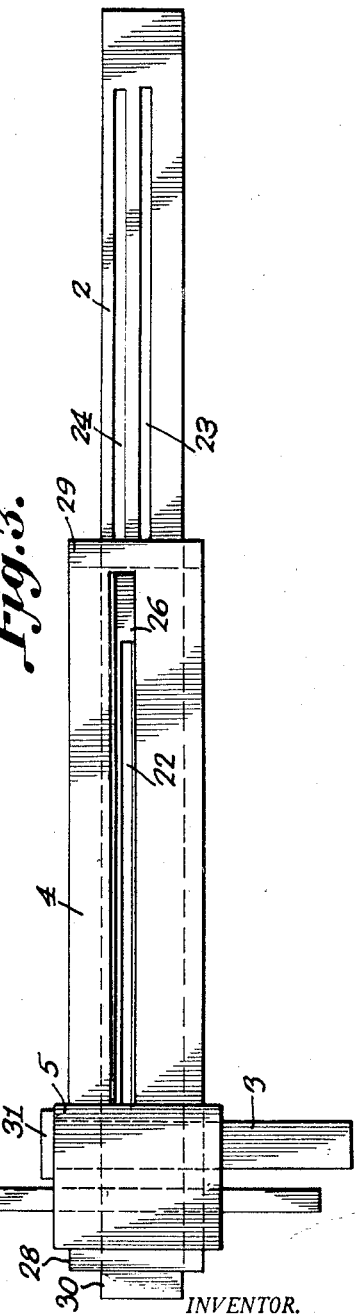
INVENTOR.
MORTIER W. LaFEVER.
BY
ATTORNEYS.

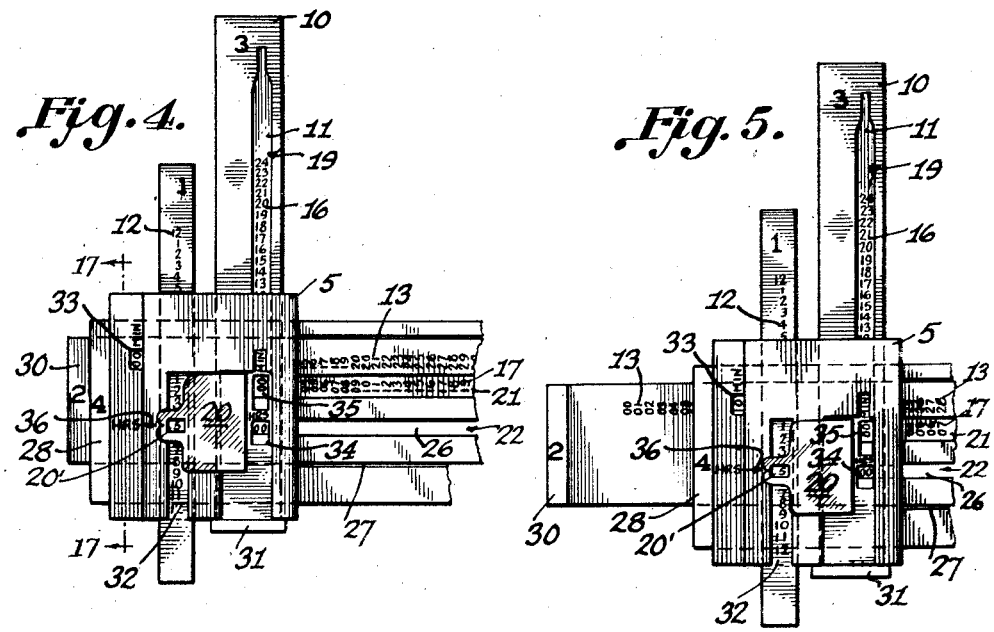
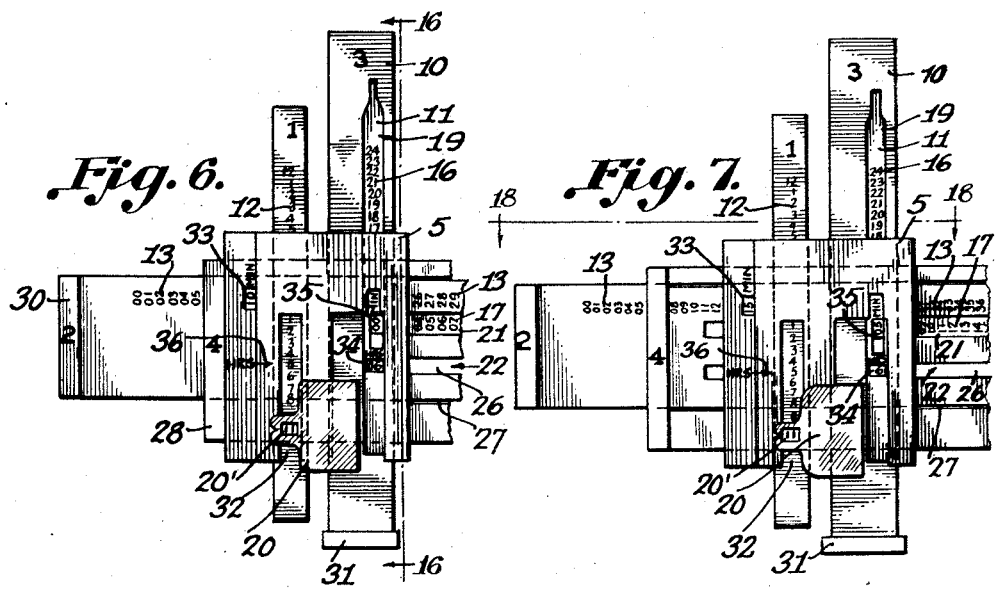

Jan. 14, 1941.    M. W. LA FEVER    2,228,274
CALCULATING DEVICE
Filed July 30, 1938    3 Sheets-Sheet 3
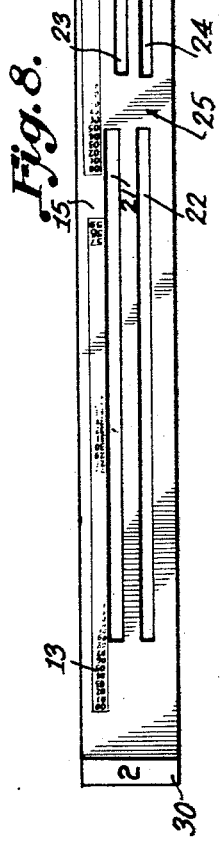
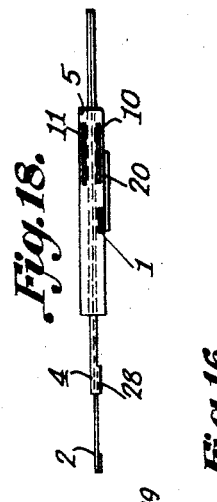
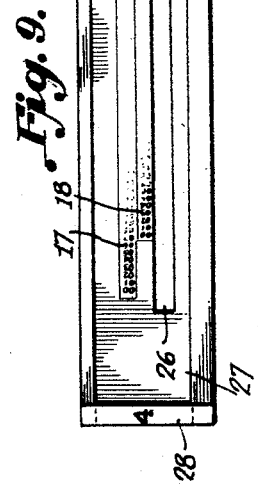
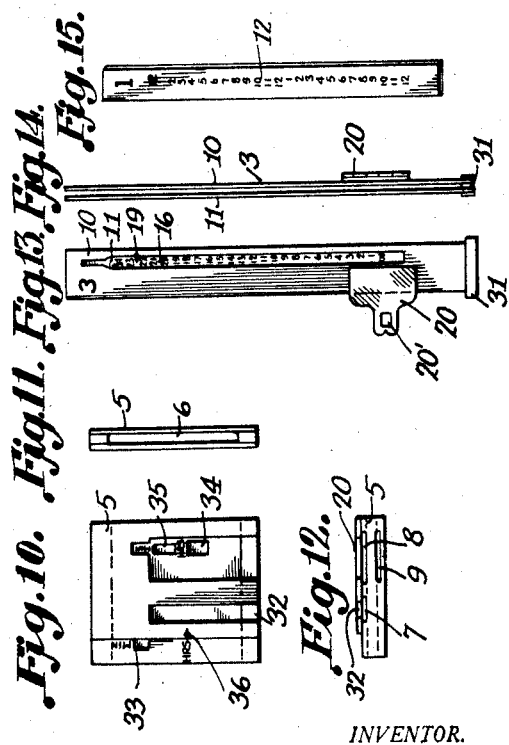
INVENTOR.
MORTIER W. LAFEVER.
BY
ATTORNEYS.

Patented Jan. 14, 1941

2,228,274

UNITED STATES PATENT OFFICE 2,228,274

CALCULATING DEVICE

Mortier W. La Fever, Falls Church, Va.

Application July 30, 1938, Serial No. 222,143

8 Claims. (Cl. 235—70)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention relates to calculating devices of the slide rule type and has for its object the determination, simply and accurately, with a direct reading, of differences between specified quantities. It is particularly suitable where scales of measurement are not expressed in a geometric series and where a unit and a fractional unit are involved, as for example, hours and minutes, pounds and ounces, pounds (sterling) and shillings, feet and inches, months and days, etc.

The object of my invention is to provide a device for measuring the difference between two amounts, either or both stated as a unit and a fraction. Simplicity of operation, and the provision of windows or indicators in or at which appears the absolute difference between quantities set on the scales, makes the device desirable for offices in taking job time from job tickets, banks handling foreign money, etc., as well as an educational device, or toy, for school children in working time and measurement problems.

While the device is herein described as applying to time its principles may be varied in construction to a wide field of application in many other scales of measuring.

Other objects will become apparent from the drawings and a reading of the following description.

I have illustrated in the accompanying drawings a workable device, as applied to hours and minutes, having characteristics of my invention and by which it may be practiced:

Fig. 1 is a top plan view of my device as described hereinafter,

Fig. 2, a front elevational view, and

Fig. 3, a bottom view.

Figs. 4, 5, 6, 7 show the operation of slides numbered 1, 2, 3, and 4, respectively, in determining the elapsed time from 5:10 to 11:15 (a. m. or p. m.).

Fig. 4 with slide 1 drawn to desired position, indicates the first operation;

Fig. 5, with slide 2 drawn to desired position, the second operation;

Fig. 6, with slide 3 drawn to desired position, the third operation; and

Fig. 7, with slide 4 drawn to desired position, the last operation, giving absolute result 6 hours and 05 minutes in the righthand windows or indicators of the device.

Fig. 8 is a top plan view of slide 2,

Fig. 9, a top plan view of slide 4,

Fig. 10, a top plan view of the chassis or block through which all slides are operated, Fig. 11, a righthand view of the sides of block, Fig. 12, a front elevational view of the chassis or block, Fig. 13, a top plan view of slide 3, Fig. 14, a side elevational view of slide 3, Fig. 15, a perspective view of slide 1, Fig. 16, a transverse section taken on line 16—16 of Fig. 6, Fig. 17, a transverse section taken on lines 17—17 of Fig. 4, and Fig. 18, a longitudinal section taken on lines 18—18 of Fig. 7.

It is to be understood that although my device is herein described with scales, slots and parts in a definite relation, such relation may necessarily have to be modified or changed in the construction of a device to apply its principles to different scales of measure.

In the drawings the adaptation shown to describe my invention comprises slides 1, 2, 3, and 4 and chassis or block 5 (see Fig. 10) provided, in one direction, with a single longitudinal opening 6 edgewise of the block (see Fig. 11) and adapted to slidingly receive slides 2 and 4 (see Figs. 8 and 9). Slide 2 may be conveniently nested in slide 4 (see Fig. 17).

Above and below the longitudinal opening 6, and also edgewise of the block 5, the block is further provided with additional openings 7, 8, and 9 disposed transversely of the opening 6 (see Fig. 12). The opening 7 is adapted to slidingly receive slide 1 (see Fig. 15) above or in front of slides 2 and 4, and the other two openings 8 and 9, disposed parallel to each other above and below opening 6, and to one side of opening 7, are adapted to slidingly receive slide 3 (see Fig. 14) having two blades 10 and 11.

The slides 1, 2, 3, and 4 are provided with scales of certain calibrations or indicia whereby differences between specified quantities may be simply and accurately determined by the simple movement and setting of the slides, and the observation of certain readings at indicators, as will be explained hereinafter.

To clearly describe the invention, and as one exemplary adaptation of the device, the slides are provided with scales calibrated in hours and minutes as a means for measuring elapsed time between predetermined hours and minutes. The scales can be assumed to represent either a. m. and p. m. or p. m. and a. m. to meet the needs of the problem to be solved.

For hour and minute computations, slide 1 is provided with a calibrated hour scale 12, disposed lineally of the slide, to cover a 24-hour period reading downwardly 12, 1, 2, etc., to 12, inclusive, and thence 1, 2, etc., to 12, inclusive (see Figs. 4 to 7); slide 2 with two calibrated minute scales 13 and 14 disposed in a single lineal line each reading left to right 00 to 59, inclusive, but with a gap 15 (to be explained hereinafter) between the two series (see Fig. 8); slide 3 with a calibrated hour scale 16, disposed lineally on the inner face of blade 11, calibrated to cover 24 hours reading downwardly 24, 23, etc., to 00, inclusive; and slide 4 with two calibrated minute scales 17 and 18 (see Fig. 9) disposed parallel to each other but with one lineally advanced, for purposes explained hereinafter, with respect to the other a distance corresponding in length with that of the gap 15, on slide 2, and each calibrated to read, left to right, 00 to 59, inclusive.

Slide 1 is a simple single slide as distinguished from the other transverse slide 3. The front or upper blade 10 of the latter slide 3 is provided with an opening 19 through which the calibrated hour scale 16 on blade 11 may be vizualised. The blade 10 of slide 3 is provided primarily as a means for carrying an indicator 20, having a window type index 20'; movable with the slide 3 and operable as an indicator with respect to the calibrated hour scale 12 on slide 1.

Slide 2 is provided with two pair of linearly disposed parallel openings 21—22 and 23—24 with a dividing portion providing a gap 25, corresponding in length with gap 15 on slide 2, between the adjacent ends of the respective pairs and with one pair transversely offset with respect to the line of the other. One opening of each pair, namely, openings 21 and 23, are provided and so positioned as to make the side by side minute scales 17 and 18, respectively, on slide 4 visible therethrough. The other opening of each pair, namely, openings 22 and 24, are provided and so positioned as to make calibrations of scale 16 on slide 3 visible therethrough. The openings 22 and 24 are offset sufficiently to indicate a jump of one calibration, or one hour, on the scale 16 when the slide 2 is moved sufficiently to cause the gap 25 to pass over scale 16 on slide 3. The purpose of this jump, as will be further explained hereinafter, is to diminish the measure of hours by 1 in any case where the number of minutes in the beginning clock time is greater than the number of minutes in the second or ending clock time, as for example, 5:10 to 11:05.

Slide 4 is provided with an opening 26 whereby calibrated scale 16 on slide 3 may be visualized therethrough and through openings 22 and 24 of slide 2, and is further provided with a groove or trough 27 into which slide 2 may be slidingly nested.

Slide 4 may also be provided, as shown, with collars 28 and 29 at the ends thereof to retain slide 2 within the groove 27. The collars 28 and 29 may also project above the surface of the slide and serve as stops when brought abuttingly against the block 5. Similarly, slides 2 and 3 may be provided with an additional thickness 30 and 31, respectively, at one end each thereof to serve as a stop when brought abuttingly against the collar 28 of slide 4 and the block 5, respectively. These stops should be arranged on the respective slide so that when in abutment with the respective stopping members the readings on the various scales will be zero at the indicators now to be described.

The face of the block 5 is provided with an opening 32 communicating with the edgewise opening 7 whereby calibrations of scale 12 on slide 1 may be visualized; an opening 33 communicating with the edgewise opening 6 whereby calibrations of scale 13 and 14 on slide 2 may be visualized; and opening 34 communicating with opening 9 whereby calibrations of scale 16 on blade 11 of slide 3 may be visualized therethough and through opening 19 in the blade 10 of slide 3 and and also through the openings 22 and 24 of slide 2 and opening 26 in slide 4; and an opening 35 communicating with opening 6 whereby calibrations of scales 17 and 18 on slide 4 may be visualized therethrough and through openings 21 and 23 of slide 2. The openings 32, 33, 34, and 35 in the face of the block 5 may be of the restricted indicator window type whereby but one calibration of the registering scales may be visible at any one time. The openings, however, may be of necessity large enough to visualize more then one calibration of the registering scales, in which event an indicating arrow or line is placed adjacent the opening to serve as an indicator for but one calibration of any one of the registering scales. This condition is shown as existing with respect to opening 32 adjacent the edge of which is placed an indicating arrow 36. The indicator arrows and windows 36, 33, 34, and 35 are appropriately marked hours, minutes, hours and minutes, respectively, to correspond with the respective registering scales.

Gap 25 of slide 2 is left or provided to serve as a reenforcement and division between the ends of the offset openings 21—22 and 23—24 and by reason of its inclusion a corresponding gap 15 between the scales 13 and 14 of the same slide is provided to postpone registration of calibrations of scale 14 at indicator 33 during the time that gap 25 obscures readings at indicators 34 and 35. Similarly, scales 17 and 18 are offset with respect to their beginning points sufficiently to provide a numerical continuation or numerical succession in the calibrations of scale 17 to scale 18 at the two sides of the gap 25.

For the purpose of clearly describing the actual workings of the device, reference is made to Figs. 4, 5, 6, and 7. Assuming a very simple problem, for example,—a mechanic starts repairing an automobile at 5:10 p. m. and finishes at 11:15 p. m., his work ticket being stamped to indicate the starting and ending time of the job. In computing the elapsed time slides 2, 3, and 4 are moved to zero indication at indicators 33 and 34; slide 1 is adjusted as shown in Fig. 4 so that the calibration "5" of scale 12 on slide 1 is opposite arrow indicator 36; and slide 2 adjusted as shown in Fig. 5 so that calibration "10" of scale 13 on slide 2 shows through the minute indicator window 33 in the upper left hand corner of the block. The device is thereby set to correspond with the job starting time, namely 5:10. Slides 3 and 4 are next adjusted to correspond respectively with the hour and minute upon which the job was completed. This is done by adjusting slide 3 as shown in Fig. 6 so that the calibration "11" of scale 12 on slide 1 shows through the window 20' of indicator 20 and slide 4 adjusted as shown in Fig. 7 so that the calibration "15" of scale 13 on slide 2 shows through indicator window 33 which, of course, changes the previous reading at indicator window 33, as shown in Fig. 5, since slide 2 is moved with slide 4 in this operation so as not to destroy the previously set position of slide 2 with respect to slide 4. The absolute result of duration of time may now be read as 6 hours on scale 16 of slide 3 in window indicator 34 and 05 minutes on scale 17 of slide 4 in window indicator 35.

For the solution of problems, the slides should be first zeroized and then set in the order in which the slides are numbered i. e., slide 1, slide 2, slide 3, then slide 4 (without destroying the set relationship between slides 2 and 4) for the setting, respectively, of the hour of beginning, the minutes past the hour of beginning, the hour of ending and lastly the minutes past the hour of ending.

Should the fractional amount of the larger number of the hypothetical problem just given be smaller than the fractional amount of the smaller number, such as subtracting 5:10 from 11:05, the device will operate with the same precision in the same manner. In mentally or by the pencil and paper method of subtracting 5:10 from 11:05, a whole number, or one hour, is transferred from the number 11, converted into 60 minutes and added to :05, thereby changing the number 11:05 to 10:65 from which conversion 5:10 may be readily subtracted to give a result of 5:55. In my device the same conversion is automatically accomplished by offsetting the pair of openings 23—24 from the line of the pair 21—22, in slide 2, sufficiently to bring opening 23 into play with respect to scale 18 on slide 4, and to bring opening 24 into play with the calibration on scale 16 next beneath the calibration on scale 16 which may be visible through opening 22 of slide 2. It should be observed that in problems where the number of minutes in the minuend is less than the number of minutes in the subtrahend, the slides are operated in the same manner and same numerical succession, the only difference being that slide 4 has to be drawn to the left sufficiently to utilize scale 14, rather than 13, for the fourth setting. The shifting from the use of scale 13 to the use of scale 14 of slide 2 when necessary, brings about a shifting from the use of scale 17 to scale 18 of slide 4 and brings about a change of one hour less in the result as read on scale 16 of slide 3 to give a proper result. This movement of slide 4 carries with it slide 2 as first set with respect to slide 4, or may be more clearly thought of as sliding the block 5 to the right on slide 4 without destroying the setting of slide 2 with respect to slide 4.

It should also be noted that accurate results are obtained even though the beginning time, or the minuend, which is to be set on scales 1 and 2, is smaller in numerical value than the quitting time, or the subtrahend, which is to be set on scales 3 and 4, such for example as determining the elapsed time between 5:30 p. m. (the minuend) and 11:40 a. m. (the subtrahend).

Any similar problem coming within the limits of scales used in manufacturing the devices can be worked similarly. It will be readily understood that different scales for different computations may be substituted, for instance, dollars and cents, months and days, years and months, feet and inches, inches and fractions thereof, whole numbers and tenths, whole numbers or fractions, etc., may be substituted for the hour and minute scales, respectively, and differences between any two numbers and/or fractions thereof determined in the manner hereinbefore described.

I claim:

1. A calculating device of the slide-rule type comprising a pair of scale-provided slides slidingly operable independently of and substantially parallel with each other, a second pair of scale-provided slides operable transversely of the first pair, one slide of said second pair being superimposed upon and slidingly retained by the other slide of that pair, said superimposed slide being provided with a longitudinal opening through which the scale of its retaining slide may be visualized and provided further with another longitudinal opening registering with a longitudinal opening provided in said retaining slide through which registering openings points on the scale of one slide of said first pair may be visualized, a body member for said slides and for operably receiving and retaining one pair of slides transversely of the other pair and provided further with indicators indicative of points on the scales of the respective slides.

2. A calculating device of the slide-rule type comprising a pair of scale-provided slides slidingly operable independently of and substantially parallel with each other, a second pair of scale-provided slides operable transversely of the first pair, one slide of said second pair being superimposed upon and slidingly retained by the other slide of that pair, said superimposed slide being provided with a longitudinal opening through which the scale of its retaining slide may be visualized and provided further with another longitudinal opening registering with a longitudinal opening provided in said retaining slide through which registering openings points on the scale of one slide of said first pair may be visualized, a substantially flat body member having non-interrupting transverse openings interposed between its planar surfaces for operably retaining one pair of slides transversely of the other pair and having other openings in the face thereof communicating with said surface interposed openings whereby specific settings and readings may be taken from the scales of the respective slides.

3. A calculating device of the slide-rule type for determining the resultant difference between two predetermined whole or mixed number quantities or values comprising a pair of scale-provided slides one of which is slidingly nested within the other, a body member having openings for receiving and operably retaining said slides, and another pair of scale-provided slides operable independently of each other and operably carried by said body member transversely of said first pair of slides, said body member and one slide of each pair having other openings whereby the scales of each slide may be seen through the face of said body member.

4. A calculating device of the slide-rule type for determining the resultant difference between two predetermined whole or mixed number quantities or values comprising a pair of scale-provided slides one of which is mounted within the planes of the other and slidably operable longitudinally thereof, the scale of one slide of said pair being visible through the other slide of said pair, a body member having openings for receiving and operably retaining said slides, and another pair of scale-provided slides operable independently of each other and operably carried by said body member in a manner whereby they are spaced from each other and operable transversely of said first pair of slides, the scale of one of said first pair of slides being visible through an opening in one slide of said second pair and the scales of all slides being visible through the face of said body member.

5. A calculating device of the slide-rule type for determining the difference between predetermined whole or mixed number minuends and subtrahends comprising the combination of a pair of scale-provided slides slidingly operable independently of and substantially parallel with each other for indicating respectively a whole number minuend and a whole number subtrahend, a second pair of scale-provided slides operable transversely of the first pair for respectively indicating fractional amounts of said minuend and subtrahend, one slide of said second pair of slides being superimposed upon and slidingly retained by the other slide of that pair, said superimposed slide being provided with a longitudinal opening through which the scale of its retaining slide may be visualized and provided further with another longitudinal opening registering with a longitudinal opening provided in said retaining slide through which registering openings points on the scale of one slide of said first pair may be visualized and a body member for operably retaining relative positions of said slides, said body member having means for indicating a single result from the relative positions of said slides.

6. A calculating device of the slide-rule type comprising a body member so formed as to operably retain a plurality of slides and having fixed indicators indicative of points on said slides, a pair of slides operable transversely and independently of each other carried by said body member, one of which slides is provided with a fixed scale calibrated into whole number units of equal value and the other of which slides is provided with a scale calibrated into units of equal value each representing a fractional amount of one of said whole number units, and a second pair of slides similarly operable transversely and independently of each other also carried by said body member and provided with calibrated scales of the same value respectively as the first pair of slides, one slide of said second pair being provided further with an opening through which the scale of the other slide of said second pair may be seen.

7. A calculating device of the slide-rule type for determining the difference between mixed numbers comprising calibrated slides operably carried by a body member which body member in turn is provided with indicator openings indicative of certain of said calibrations characterized by the fact that there are two slides operable parallel of each other and each provided with scales calibrated into whole number units of equal value, and two slides operable transversely of the first named slides and each provided with scales calibrated into units of equal value each representing a fractional amount of one of said whole numbers and characterized further by the fact that the individual calibrations of one of said first pair of slides is visible through the second pair of slides whereby individual calibrations of the respective slides are visible through one side of said body member at said openings in order that the setting of the problem by the operation of said slides may be seen by the operator and in order that the result may be read on one slide of each pair irrespective of the transverse positions and operations of said slides.

8. A calculating device of the slide-rule type comprising a pair of scale-provided slides one of which is slidingly mounted within the other, a second pair of scale-provided slides operable independently of each other and transversely of said first pair of slides, the first pair of slides having elongated registering openings through which a calibration of the scole of one of the second pair of slides may be seen and said one of said second pairs of slides having an opening in which a calibration of the scale of one of the first pair of slides may be seen, a substantially flat body member having non-intercepting transverse openings interposed between its planar surfaces for operably retaining the respective pairs of slides transversely of each other, said body member having other openings in the face thereof communicating with said transverse openings whereby points on the scales of both pairs of said slides may be seen through the face of said body member.

MORTIER W. LA FEVER.